United States Patent [19]

Aubourg et al.

[11] Patent Number: 4,644,707
[45] Date of Patent: Feb. 24, 1987

[54] ROTATABLE BUILDING FRAME

[76] Inventors: Peter L. Aubourg; John W. Carrick, both of Fanshawe Road, Otford, New South Wales 2508, Australia

[21] Appl. No.: 618,490
[22] Filed: Jun. 8, 1984
[51] Int. Cl.⁴ .............................................. F16L 27/08
[52] U.S. Cl. .......................................... 52/65; 137/580
[58] Field of Search ................ 52/65, 73, 236.1, 220, 52/221; 137/580, 357; 285/190

[56] References Cited

U.S. PATENT DOCUMENTS

| | | | |
|---|---|---|---|
| 1,593,665 | 7/1926 | Moores | 52/65 |
| 1,697,261 | 1/1929 | Daughs | 137/580 |
| 2,563,531 | 8/1951 | Kirkman | 52/65 |
| 2,701,146 | 2/1955 | Warren | 285/190 |
| 2,764,783 | 10/1956 | Teller | 52/65 |
| 3,078,522 | 2/1963 | Anderson | 52/65 |
| 3,093,869 | 6/1963 | Ranney | 52/65 |
| 3,125,189 | 3/1964 | Graham | 52/65 |
| 3,395,500 | 8/1968 | Smith | 52/65 |
| 3,408,777 | 11/1968 | Ghirelli | 52/65 |
| 3,491,496 | 1/1970 | Johnston | 52/65 |
| 3,513,871 | 5/1970 | Johnston | 52/65 |
| 3,636,975 | 1/1972 | Kirkman | 52/65 |
| 3,804,111 | 4/1974 | Chatard | 52/65 |
| 4,353,608 | 10/1982 | Massau | 52/65 |

FOREIGN PATENT DOCUMENTS

| | | | |
|---|---|---|---|
| 2305541 | 8/1974 | Fed. Rep. of Germany | 52/65 |
| 1242847 | 4/1960 | France | 52/65 |
| 618268 | 3/1961 | France | 52/65 |
| 1465701 | 12/1966 | France | 52/65 |
| 653347 | 4/1963 | Italy | 52/65 |
| 183877 | 8/1922 | United Kingdom | 52/65 |
| 606989 | 5/1979 | U.S.S.R. | 52/65 |

Primary Examiner—John E. Murtagh
Attorney, Agent, or Firm—Fitch, Even, Tabin & Flannery

[57] ABSTRACT

A domestic building having a base, a rotatable portion mounted on the base and providing a living space, said rotatable portion having a rigid frame supported on rollers which engage a rail fixed to the base, and a coupling to provide for the flow of water to said rotatable portion and drainage therefrom.

6 Claims, 5 Drawing Figures

ROTATABLE BUILDING FRAME

The present invention relates to buildings and more particularly but not exclusively to domestic buildings.

In the construction of domestic buildings it has been traditional for the entire structure to be stationary with respect to the ground surface upon which is supported. This has a disadvantage of the house not being thermally efficient in that the window surfaces are fixed in respect of orientation relative to the path of the sun. Additionally the stationary structures in certain instances do not take full advantage of available panoramic views.

It is the object of the present invention to overcome or substantially ameliorate the above disadvantages.

There is disclosed herein a building comprising a ground engaging base, a generally rigid frame rotatably supported on the base so as to be rotatable about a vertical axis, and service lines connecting said base and frame so as to extend generally coaxial with said vertical axis.

There is further disclosed herein a building comprising a ground engaging base, a frame rotatably supported on the base so as to be rotatable about a vertical axis, a coupling mounted so as to extend generally coaxial with said axis to enable the drainage of sewerage from said building and the delivery of mains water pressure to said building, said coupling comprising a first sleeve to be fixed stationary relative to said base, said sleeve extending generally coaxial with respect to said axis and being adapted to be coupled to a drainage line, a second sleeve also coaxial with said axis and sealingly engaging said first sleeve, said second sleeve being adapted to be attached to a drainage conduit fixed to said frame, a manifoled of generally annular configuration surrounding said first and second sleeves and spaced radially therefrom, said manifold having an inlet to be attached to a mains water supply, and an outlet to deliver water to water outlets fixed to said frame, said manifold including a first portion having said outlet, and a second portion having said inlet, and sealing means connecting said first and second portions to allow relative rotation therebetween about said axis.

A preferred form of the present invention will now be described by way of example with reference to the accompanying drawings wherein.

Figure 1:
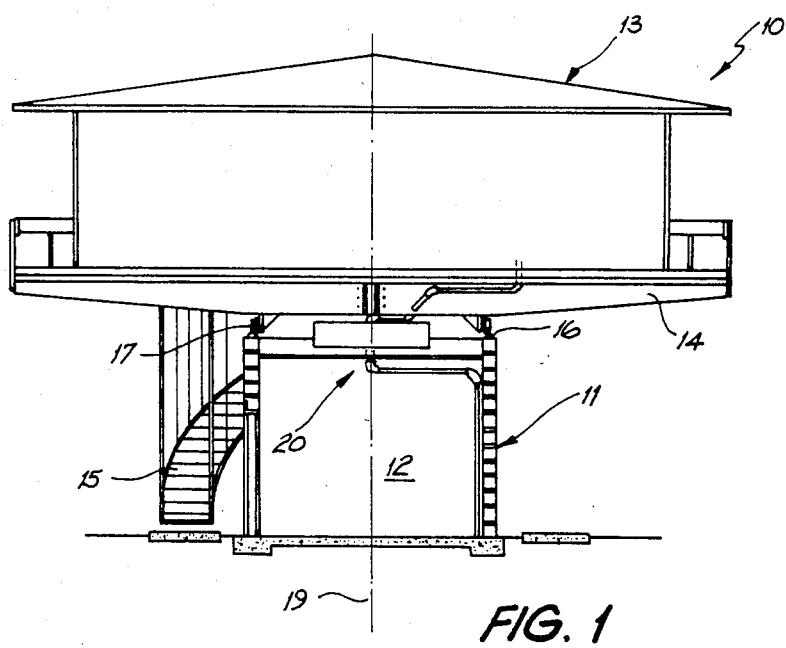
FIG. 1 is a schematic side elevation of a domestic building.
Figure 2:
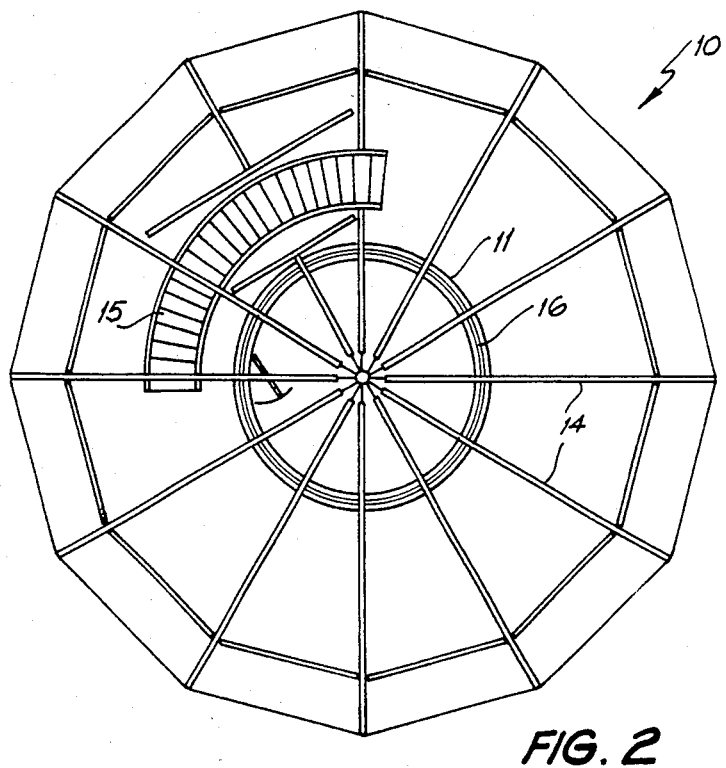
FIG. 2 is a schematic plan view of the building of FIG. 1.
Figure 5:
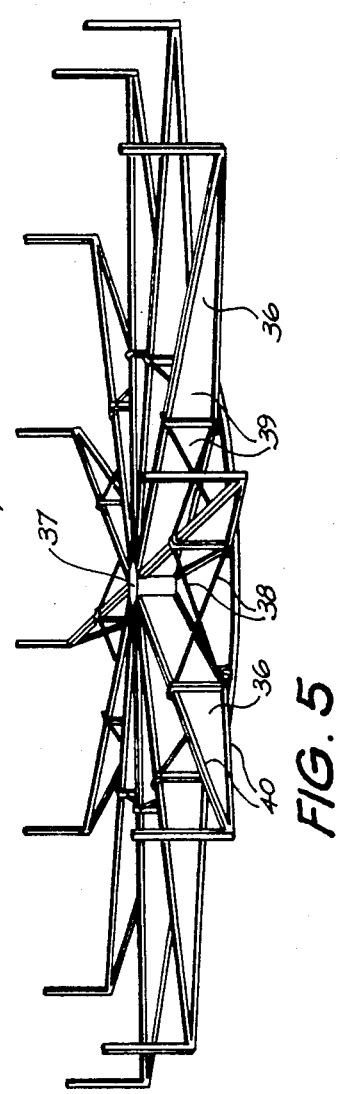
FIG. 5 is a schematic perspective view of a frame employed in the building of FIG. 1.

In FIG. 1 there is schematically depicted a domestic building 10 having a ground engaging base 11 which for example may have an enclosed area 12 to house a motor vehicle. Supported on the base 11 is a structure 13 forming the living area of the building 10. The structure 13 includes a generally rigid frame 14 which generally consists of radially extending beams (as best seen in FIG. 5) which form the support for the walls, floor, and roof structure. Depending from the frame 14 is a staircase 15 so as to rotate therewith.

Figure 3:
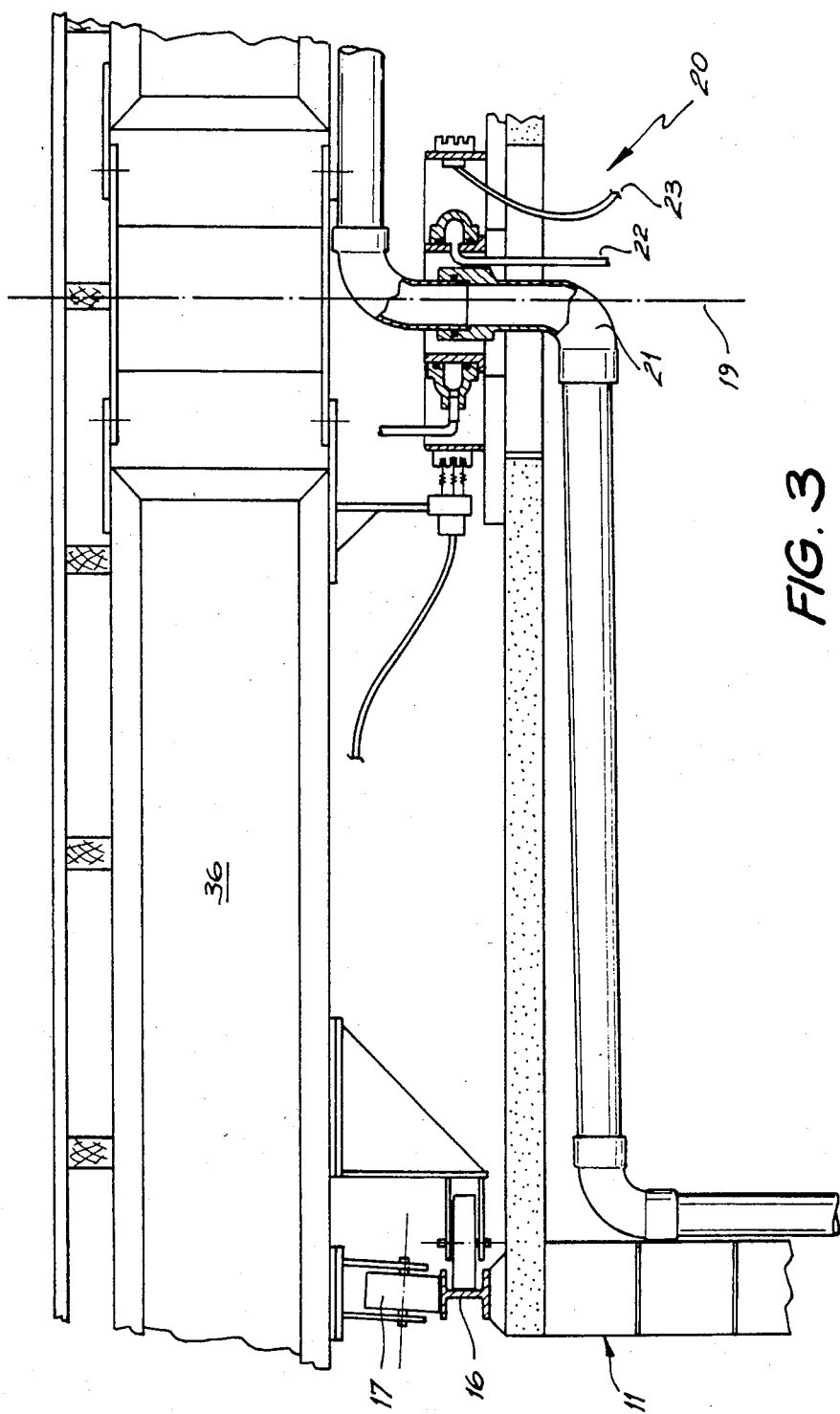
FIG. 3 is schematic section side elevation of a central portion of the building of FIG. 1 wherein the service lines are more fully depicted.

Now with particular reference to FIG. 3, the frame 14 can be seen as being supported on the base 11 by means of a circular rail 16 which is engaged by a plurality of wheels 17 and 18, arranged in pairs, with at least one of the wheels 17 being driven by an electric motor and gearbox assembly. The wheels 17 and 18 would be located at angularly spaced locations about the central axis 19, about which the structure 14 rotates.

Connecting the base 11 and frame 14 is a service line assembly 20 which as can be seen in FIG. 3, includes a sewerage line 21, a mains water supply 22 and mains electrical supply 23. The sewerage line 21 would be coupled to a conduit 24 by means of a rotatable coupling 25 including a seal assembly sealingly connecting the sewerage line 21 and conduit 24 so as to allow for relative rotation therebetween about the axis 19. Surrounding the sewerage line 21 is an annular member 30 which receives the water supply conduit 22 so that water therefrom is transferred to an annular cavity 26 defined by a manifold 27. Extending from the manifold 27 is a water pipe 28 which services the structure 13. Also coaxial with the axis 19 is a slip ring assembly 29 which enables the transfer of electrical power from the mains supply to a electric line 30 which services the structure 13.

Figure 4:
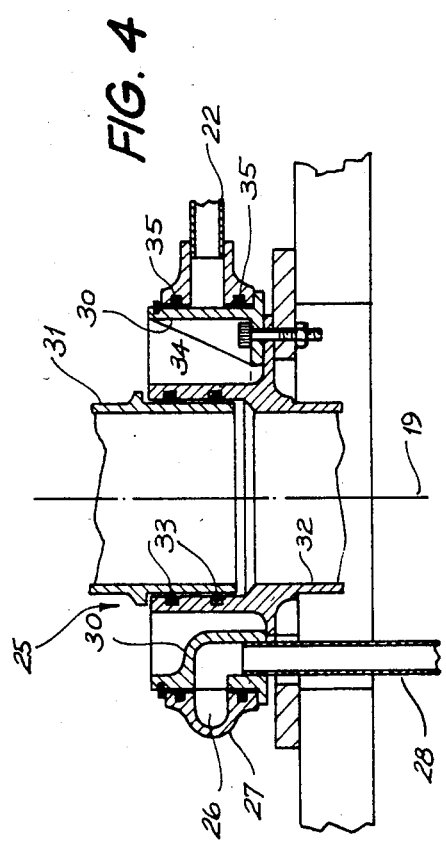
FIG. 4 is a schematic section side elevation of a coupling used in the domestic building of FIG. 1 to provide for the delivery of mains pressure water to and drainage from the building.

The rotatable coupling 25 is more fully depicted in FIG. 4. As can be seen from FIG. 4, the seal assembly 25 includes an inner sleeve 31 connected to the conduit 21, and an outer sleeve 32 connected to the conduit 24. Sealingly connecting the two sleeves 31 and 32 are a pair of O-rings 33 which allow for relative rotation between the two sleeves 31 and 32 about the axis 19. It should be appreciated that the seal assembly 25 is designed so that should leakage occur, then such leakage will be vented to the exterior of the coupling 25 without any danger of the leakage entering the water supply system. Particularly it should be noted that there is an annular cavity 34 existing so as to separate the sewerage drainage system from the water supply system.

The manifold 27 sealingly engages the annular member 30 by means of a pair of spaced O-rings 35. Again, any leakage which may occur, will be vented to the exterior of the manifold 27.

In FIG. 5 the frame 14 is more fully depicted. As can be seen, the frame 14 consists of a plurality of radially extending beams 36 fixed at their radially inner ends to an annular member 37. The beams 36 are held in their angularly spaced position by means of cross braces 38. In the present embodiment, the beams 36 consist of sheet metal centre portions 39 to which there is welded edge members 40 which add to the rigidity of each of the beams 36. It is particularly emphasised, that the frame 14 is generally rigid thereby necessitating accurate location of the rail 16.

It is an advantage of the above described preferred embodiment of the present invention, that the window areas or other areas may be oriented so as take advantage of the radiant energy emitted by the sun while still further the structure 13 may be oriented so as to take advantage of various views. This is achieved by rotatably driving the frame 14 about the rail 16 by driven flanged wheel 17.

What we claim is:

1. A building structure including a rigid floor frame supported on a pedestal base, said base being supported on a ground surface so as to extend upwardly therefrom and terminating at its upper end with a support for said floor frame, said floor frame having engaging means to engage said support, said support and engaging means providing an annular surface oriented in a generally horizontal plane and a plurality of rollers abutting said annular surface thereby enabling rotation of said frame about the longitudinal axis of said annular surface, a coupling mounted so as to extend generally coaxial with respect to said axis to enable the drainage of sewerage from said floor frame and the delivery of mains water pressure to said floor frame, said coupling comprises a first sleeve to be fixed stationary relative to said base, said sleeve extending generally coaxial with respect to said axis and being adapted to be coupled to a drainage line, a second sleeve also coaxial with said axis and sealingly located within an upper portion of said first sleeve, said second sleeve being adapted to be attached to a drainage conduit fixed to said floor frame, a manifold of generally annular configurations surrounding said first and second sleeves and spaced radially therefrom, said manifold having an inlet to be attached to said mains water supply, and an outlet to deliver water to water outlets fixed to said frame, said manifold including a first portion having said outlet, and a second portion having said inlet, and seal means connecting said first and second portions to allow relative rotation therebetween about said axis, and wherein said manifold provides an annular cavity separating the inlet and outlet for said water, from said first and second sleeve which provide for the drainage of sewerage.

2. The building structure of claim 1 wherein said first portion cooperates with said second sleeve to define said annular cavity which is open downwardly and surrounds said first and second sleeves.

3. The building structure of claim 2 wherein said second portion is spaced radially outwardly relative to said axis from said first portion.

4. The building of claim 1 wherein said first portion is formed as a single body with said second sleeve.

5. The building structure of claim 4 wherein said first portion cooperates with said second sleeve to define said annular cavity which is open downwardly and surrounds said first and second sleeves.

6. The building structure of claim 4 wherein said second portion is spaced radially outwardly relative to said axis from said first portion.

* * * * *